United States Patent Office 3,700,608
Patented Oct. 24, 1972

3,700,608
PROCESS FOR PREPARING ALKYLENE
OXIDE POLYMER
Katsuji Ueno and Takao Oshima, Osaka, Japan, assignors
to Sumitomo Chemical Co., Ltd., Osaka, Japan
No Drawing. Filed Jan. 7, 1971, Ser. No. 104,809
Claims priority, application Japan, Jan. 7, 1970,
45/2,628
Int. Cl. C08d
U.S. Cl. 260—2 A
10 Claims

ABSTRACT OF THE DISCLOSURE

A process for preparing alkylene oxide polymers or copolymers having high molecular weights comprising polymerizing at least an alkylene oxide in the presence of a ternary catalyst system comprising an organo-aluminum compound, an organo-zinc compound and an orthophosphoric acid is disclosed.

BACKGROUND OF THE INVENTION

(1) Field of the invention

The present invention relates to a process for preparing alkylene oxide polymers or copolymers which comprises polymerizing at least an alkylene oxide in the presence of a ternary catalyst system.

(2) Description of the prior art

Alkylene oxide polymers have been used in a variety of applications. For example, polymers of propylene oxide or epichlorohydrin, and copolymers of propylene oxide with allyl glycidyl ether have been used as synthetic rubbers, and polymers of ethylene oxide are useful as water-soluble high molecular weight compounds. Generally, these polymers of alkylene oxides are of greater commercial value as the molecular weight of the polymers increases.

A number of catalyst systems for polymerizing alkylene oxides have hitherto been proposed. For example, an organo-aluminum-water type catalyst, an organo-zinc water type catalyst, an organo-aluminum-water-acetyl acetone type catalyst, a reaction product of zinc acetate and aluminum alkoxide, an organo-aluminum-phosphoric acid type catalyst, and the like, have been proposed.

In general, the use of an organo-aluminum compound alone as the catalyst for the copolymerization of, for instance, propylene oxide with allyl glycidyl ether, does not cause copolymerization. The use of an organo-aluminum-phosphoric acid type catalyst exhibits comparatively greater polymerization activity but only produces a copolymer having a low degree of polymerization. Thus, it is difficult to obtain propylene oxide-allyl glycidyl ether copolymers which are sufficiently useful as rubbery materials. The use of an organo-zinc-phosphoric acid type catalyst rarely produces a copolymer having a high molecular weight.

The primary object of the present invention is to provide a process for preparing alkylene oxide polymers or copolymers having a high molecular weight in an advantageous manner.

SUMMARY OF THE INVENTION

The present inventors have now found that the use of a ternary catalyst system comprising (a) an organo-aluminum compound, (b) an organo-zinc compound and (c) an orthophosphoric acid is effective for preparing alkylene oxide polymers or copolymers having a high molecular weight at a very high reaction rate.

DETAILED DESCRIPTION OF THE INVENTION

The present invention is based on the above discovery and relates to a process for preparing alkylene oxide polymers or copolymers. The process comprises polymerizing at least an alkylene oxide in the presence of a ternary catalyst system comprising (a) an organo-aluminum compound represented by the general formula $AlR_3-nXn$, wherein R is the same or a different hydrocarbon radical such as alkyl, allyl, aralkyl, phenyl and the like having from 1 to 12 carbon atoms, $n$ is 0 or 1, and X is a member selected from the group consisting of a hydrogen atom, a halogen atom, and an alkoxy radical having from 1 to 12 carbon atoms, (b) an organo-zinc compound represented by the general formula $ZnR'Y$, wherein R' is a hydrocarbon radical such as alkyl, allyl, aralkyl, phenyl and the like having from 1 to 12 carbon atoms, and Y is a member selected from the group consisting of a hydrocarbon radical such as alkyl, allyl, aralkyl, phenyl and the like having from 1 to 12 carbon atoms, and (c) an orthophosphoric acid.

Representative examples of organo-aluminum compounds having the above-described formula are as follows: triethyl aluminum, tri-n-propylaluminum, tri-n-butyl aluminum, triisobutyl aluminum, tri-n-hexyl aluminum, triisohexyl aluminum, diethyl isobutyl aluminum, tri-cyclohexyl aluminum, triphenyl aluminum, diisobutyl aluminum monochloride, disopropyl aluminum monoisoperoxide, diisobutyl aluminum hydride and mixtures thereof.

Representative examples of organo-zinc compounds having the above-described formula include: diethyl zinc, di-n-butyl zinc, diisobutyl zinc, diisoamyl zinc, dicyclohexyl zinc, diphenyl zinc, ethyl zinc chloride, isobutyl zinc iodide, ethyl zinc isopropoxide, and mixtures thereof.

The orthophosphoric acid to be used in the present invention contains the structure $P(O)(OH)_3$ as its main component. This is obtained, for example, by thermally dehydrating commercial aqueous phosphoric acid solution at a temperature below 250° C. under atmospheric or reduced pressure.

In the method of the present invention, any compound containing an oxirane group can generally be polymerized or copolymerized. Representative examples of these compounds include: ethylene oxide, propylene oxide, 1,2-epoxybutane, 2,3-epoxybutane, epichlorohydrin, epibromohydrin, cyclohexene oxide, allyl glycidyl ether, butadiene monoxide, styrene oxide and mixtures thereof.

In carrying out the method of the present invention, the ratio of the organo-aluminum compound and the organo-zinc compound to the orthophosphoric acid in the ternary catalyst system is selected within such as range that the organo-aluminum compound and the organo-zinc compound are, respectively, present in an amount of from 0.05 to 50 moles, preferably 0.1 to 10 moles, per mole of the orthophosphoric acid.

The ternary catalyst system to be used in the present invention can be prepared by mixing the organo-aluminum compound, the organo-zinc compound and the orthophosphoric acid in accordance with any method. However, it is preferred to mix the three components in an inert solvent (for example, hydrocarbons, ethers and chlorinated hydrocarbons).

The ternary catalyst system of the present invention can be prepared at any desired temperature. For instance, the preparation can be carried out at a temperature as low as −80° C. or as high as about 150° C. under atmospheric pressure. The ternary catalyst system can be prepared under increased or reduced pressure, if desired.

The ternary catalyst system can be prepared by intermixing all three components at once before starting the polymerization, or two components can be added prior to the initiation of the polymerization, and then the remaining third component can be added to the mixture of any two components after the initiation of the polymerization. It is also possible to prepare the ternary catalyst system in the polymerization system by adding any one or two components to the monomer thereby to start the polymerization and by adding the remaining component to the system subsequently, thereafter continuing the polymerization.

In this case, it is convenient to firstly react the organoaluminum compound with the orthophosphoric acid and then add to the product the organo-zinc component. This often gives good results.

The proportion of the ternary catalyst system in the reaction system in carrying out the process of the present invention is usually determined so that the orthophosphoric acid is present within the range of from 0.0001 to 0.1 mole, preferably 0.001 to 0.02 mole, for each mole of alkylene oxide.

The polymerization is carried out at a temperature within the range of from −78° to 200° C., preferably from −30° to 120° C.

The pressure under which the polymerization is carried out is not critical. The polymerization is advantageously conducted under atmospheric pressure, but the polymerization can also be carried out under increased or reduced pressure.

The polymerization can be carried out under a variety of conditions and can be operated as a batch or continuous operation according to a variety of practical embodiments wherein the catalysts are added at the same time or intermittently, or successively, during the polymerization. It is also possible, if desired, to gradually add the monomer to the reaction system. The polymerization can be carried out in a bulk polymerization process, and in some instances, it is carried out at the boiling point of the monomer in order to remove the heat of the reaction. The polymerization is generally conducted in an inert solvent so as to facilitate the operation. Any type of solvent which is inert under the polymerization conditions can be used. Examples of such solvents are hydrocarbons (for example, benzene, toluene, n-hexane, n-heptane, cyclohexane and Decalin); ethers (for example, diethyl ether, di-n-propyl ether, tetrahydrofuran and dioxane); halogenated hydrocarbons (for example, chlorobenzene and methylene chloride); and mixtures of any two or more of the above solvents.

The process of the present invention is further explained according to the following examples which are given as merely illustrative and not limiting in nature.

EXAMPLE 1

A three-necked flask equipped with a stirrer, a thermometer and a dropping funnel was charged with 10 ml. of sufficiently dehydrated diethyl ether and 5 millimoles of orthophosphoric acid obtained by heating a commercial 85% aqueous phosphoric acid solution at 100° C. for 10 hours under a reduced pressure of 1 mm. Hg. 10 millimoles of triisobutyl aluminum diluted with 20 ml. of toluene were added thereto dropwise, under a nitrogen atmosphere with stirring at 0° C. over a period of 10 minutes. After raising the mixture to room temperature, the resulting solution was used as the binary catalyst solution.

A hard test-tube having an inner diameter of 18 mm. and a length of 100 mm. was purged with nitrogen, then charged with 12 ml. of n-heptane, 1 ml. of the above binary catalyst solution (corresponding to 0.333 millimole of triisobutyl aluminum and 0.167 millimole of orthophosphoric acid) and an n-heptane solution of diethyl zinc (the concentration of the n-heptane solution used is shown in Table 1 below) under a nitrogen atmosphere, and cooled by Dry Ice. This tube was then charged with 3.45 g. of a mixture of propylene oxide and allyl glycidyl ether (5% by weight allyl glycidyl ether), and sealed. The polymerization was carried out in a thermostat at 50° C. for a period of 23 hours. After the completion of the polymerization, the sealed tube was cooled and opened to remove the polymer. 0.5% of Sumilizer-WX, 4,4′-thiobis(6-t-butyl-3-methylphenol), (manufactured by Sumitomo Chemical Company, Limited) was added to the polymer. The polymer was then evaporated to dryness and dried in a vacuum at 60° C. for 18 hours. The yield and the viscosity of the resultant polymers are shown in Table 1 in comparison with the results obtained by varying the concentration of diethyl ether zinc.

TABLE 1

| No. | $ZnEt_2$ (millimole) | $ZnEt_2/Al(iBu_3)$ (molar ratio) | Yield (percent) | Viscosity* ($\eta_{sp.}/c.$) |
|---|---|---|---|---|
| 1-1 | 0.0333 | 0.1 | 68.8 | 6.82 |
| 1-2 | 0.0666 | 0.2 | 69.4 | 6.65 |
| 1-3 | 0.167 | 0.5 | 63.0 | 9.64 |
| 1-4 | 0.333 | 1.0 | 52.6 | 8.80 |
| Comparison | 0 | | 86.2 | 1.96 |

*The viscosity ($\eta_{sp.}/c.$) was measured in benzene at a concentration of 0.1 g./100 ml. at 50° C.

EXAMPLE 2

Polymerization of epichlorohydrin was carried out according to the procedure of Example 1 with a varying of the concentration of triisobutyl aluminum and diethyl zinc and at a constant concentration of orthophosphoric acid, using 4.85 g. of epichlorohydrin in a mixture of 12 ml. of toluene and 0.3 ml. of diethyl ether at 50° C. for 6 hours. The results are shown in Table 2 in combination with comparative experiments.

TABLE 2

| No. | $Al(iBu)_3$ (millimole) | $ZnEt_2$ (millimole) | $H_3PO_4$ (millimole) | Yield (percent) | Viscosity* ($\eta_{sp.}/c.$) |
|---|---|---|---|---|---|
| 2-1 | 0.300 | 0.033 | 0.167 | 62.7 | 2.96 |
| 2-2 | 0.233 | 0.100 | 0.167 | 43.5 | 3.57 |
| Comparison | 0.331 | 0 | 0.167 | 53.5 | 1.65 |
| Do | 0 | 0.333 | 0.167 | 0.8 | |

*The viscosity ($\eta_{sp.}/c.$) was measured in cyclohexane at a concentration of 0.1 g./100 ml. at 50° C.

EXAMPLE 3

Polymerization of propylene oxide was carried out according to the procedure of Example 1 with the catalyst system of Table 3, using 3.50 g. of propylene oxide in a mixture of 10 ml. of n-heptane and 0.2 ml. of diethyl ether at 70° C. for 24 hours.

TABLE 3

| No. | Catalyst system | | | Yield (percent) | Viscosity* ($\eta_{sp.}/c.$) |
|---|---|---|---|---|---|
| 3-1 | Al(nHex)₂ Cl 0.300 (millimole). | Zn(nBu)₂ 0.03 (millimole). | P(O)(OH)₃ 0.150 (millimole). | 89.1 | 4.2 |
| 3-2 | Al(nBu)₂(OiPr) 0.300 (millimole). | ZnEt(OiPr) 0.06 (millimole). | do | 87.0 | 5.6 |

*The viscosity ($\eta_{sp.}/c.$) was measured in benzene at a concentration of 0.1 g./100 ml. at 50° C.

What is claimed is:

1. In a process for preparing alkylene oxide polymers or copolymers comprising polymerizing at least one mono-oxirane compound in the presence of a catalyst, the improvement which comprises said catalyst being a ternary system comprising
   (a) an organo-aluminum compound represented by the formula $AlR_3-nX_n$, wherein R, which may be the same or different, is a hydrocarbon radical having from 1 to 12 carbon atoms, $n$ is 0 or 1 and X is a member selected from the group consisting of a hydrogen atom, a halogen atom and an alkoxy radical having from 1 to 12 carbon atoms,
   (b) an organo-zinc compound represented by the formula $ZnR'Y$, wherein $R'$ is a hydrocarbon radical having from 1 to 12 carbon atoms, and Y is a member selected from the group consisting of a hydrocarbon radical having from 1 to 12 carbon atoms, a halogen atom and an alkoxy radical having from 1 to 12 carbon atoms, and
   (c) orthophosphoric acid.

2. The process according to claim 1, wherein said mono-oxirane compound is a member selected from the group consisting of ethylene oxide, propylene oxide, 1,2-epoxybutane, 2,3-epoxybutane, epichlorohydrin, epibromohydrin, cyclohexene oxide, allyl glycidyl ether, butadiene monoxide, styrene oxide and mixtures thereof.

3. The process according to claim 1, wherein said organo-aluminum compound is a member selected from the group consisting of triethyl aluminum, tri-n-propyl aluminum, tri-n-butyl aluminum, triisobutyl aluminum, tri-n-hexyl aluminum, triisohexyl aluminum, diethyl isobutyl aluminum, tricyclohexyl aluminum, triphenyl-aluminum, diisobutyl aluminum monochloride, monoethyl monoisobutyl aluminum monochloride, diisopropyl aluminum monoisopropoxide, diisobutyl aluminum hydride and mixtures thereof.

4. The process according to claim 1, wherein said organo-zinc compound is a member selected from the group consisting of diethyl zinc, di-n-butyl zinc, diisobutyl zinc, diisoamyl zinc, dicyclohexyl zinc, diphenyl zinc, ethyl zinc chloride, isobutyl zinc chloride, ethyl zinc isopropoxide and mixtures thereof.

5. The process of according to claim 1, wherein the organo-aluminum compound is present in an amount ranging from 0.05 to 50 moles per mole of the orthophosphoric acid.

6. The process according to calim 1, wherein the organo-zinc compound is present in an amount ranging from 0.05 to 50 moles per mole of the orthophosphoric acid.

7. The process according to claim 1, wherein the orthophosphoric acid is present in an amount ranging from 0.00001 to 0.1 mole per mole of alkylene oxide.

8. The process according to claim 1, wherein the polymerization is carried out at a temperature ranging from $-78°$ to $200°$ C.

9. The process according to claim 1, wherein the polymerization is carried out in the presence of an inert solvent.

10. The process according to claim 9, wherein said solvent is selected from the group consisting of benzene, toluene, n-hexane, n-heptane, cyclohexane, Decalin, diethyl ether, di-n-propyl ether, tetrahydrofuran, dioxane, chlorobenzene, methylene chloride and mixtures thereof.

References Cited

UNITED STATES PATENTS

| | | | |
|---|---|---|---|
| 3,221,059 | 11/1965 | Fukui et al. | 260—615 |
| 3,236,785 | 2/1966 | Naro et al. | 260—2 |
| 3,397,155 | 8/1968 | Naro et al. | 260—2 |
| 3,483,135 | 12/1969 | Hsieh | 252—431 |

OTHER REFERENCES

Chem. Abstracts 59, 12946c (1963).
Chem. Abstracts 63, 1900c (1965).

WILLIAM H. SHORT, Primary Examiner
EARL A. NIELSEN, Assistant Examiner

U.S. Cl. X.R.
252—431 P; 260—88.3 A, 615 B